United States Patent
Li et al.

(10) Patent No.: US 10,789,289 B2
(45) Date of Patent: Sep. 29, 2020

(54) SCENARIO-BASED SOUND EFFECT CONTROL METHOD AND ELECTRONIC DEVICE

(71) Applicant: GUANGDONG OPPO MOBILE TELECOMMUNICATIONS CORP., LTD., Dongguan, Guangdong (CN)

(72) Inventors: Yajun Li, Dongguan (CN); Hai Yang, Dongguan (CN); Gaoting Gan, Dongguan (CN); Guang Tu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/585,475

(22) Filed: Sep. 27, 2019

(65) Prior Publication Data
US 2020/0026728 A1    Jan. 23, 2020

Related U.S. Application Data

(63) Continuation of application No. 16/083,590, filed as application No. PCT/CN2017/088789 on Jun. 16, 2017.

(30) Foreign Application Priority Data

Jun. 16, 2016 (CN) .......................... 2016 1 0438816

(51) Int. Cl.
*G06F 16/632* (2019.01)
*G06F 16/683* (2019.01)
(Continued)

(52) U.S. Cl.
CPC .......... *G06F 16/634* (2019.01); *G06F 16/638* (2019.01); *G06F 16/683* (2019.01); *G06F 16/7834* (2019.01); *G06F 40/14* (2020.01)

(58) Field of Classification Search
CPC .. G06F 16/637; G06F 16/7834; G06F 16/683; G06F 16/638; G06F 40/14;
(Continued)

(56) References Cited

U.S. PATENT DOCUMENTS

| | | | |
|---|---|---|---|
| 2007/0142022 A1* | 6/2007 | Madonna | H04N 7/163 455/352 |
| 2009/0119578 A1* | 5/2009 | Relyea | G06F 9/451 715/234 |

(Continued)

FOREIGN PATENT DOCUMENTS

| | | |
|---|---|---|
| CN | 101719370 A | 6/2010 |
| CN | 103778197 A | 5/2014 |

(Continued)

OTHER PUBLICATIONS

International Search Report in the international application No. PCT/CN2017/088789, dated Aug. 30, 2017.
(Continued)

*Primary Examiner* — Andrew C Flanders

(57) ABSTRACT

Disclosed are a scenario-based sound effect control method and an electronic device. The method comprises: after being turned on, an electronic device enables a service having an interception function; the electronic device intercepts, by using the service having the interception function, whether there is a newly created audio decoder and/or video decoder in the electronic device; if determining that there is the newly created audio decoder and the video decoder in the electronic device, the electronic device determines that a current scenario is a video playing application scenario; the electronic device obtains a scenario-based sound effect corresponding to the video playing application scenario, and sets a current sound effect of the electronic device as the scenario-based sound effect.

6 Claims, 5 Drawing Sheets

(51) Int. Cl.
*G06F 16/783* (2019.01)
*G06F 16/638* (2019.01)
*G06F 40/14* (2020.01)

(58) Field of Classification Search
CPC ............ G06F 3/16; G06F 3/162; G06F 3/165; H04N 21/4431; H04N 21/442; H04N 21/44231; H04N 21/443; H04N 21/41; H04N 21/258
See application file for complete search history.

(56) References Cited

U.S. PATENT DOCUMENTS

| 2013/0167027 A1* | 6/2013 | Adolph | H04N 21/439 |
| | | | 715/716 |
| 2014/0208310 A1 | 7/2014 | Lee et al. | |
| 2016/0065437 A1 | 3/2016 | Xu | |

FOREIGN PATENT DOCUMENTS

| CN | 103841495 A | 6/2014 |
| CN | 103970526 A | 8/2014 |
| CN | 104090766 A | 10/2014 |
| CN | 104093072 A | 10/2014 |
| CN | 105468388 A | 4/2016 |
| CN | 105490894 A | 4/2016 |
| CN | 105959482 A | 9/2016 |
| EP | 2424129 A2 | 2/2012 |
| KR | 20110009950 A | 1/2011 |

OTHER PUBLICATIONS

English translation of the Written Opinion of the International Search Authority in the international application No. PCT/CN2017/088789, dated Aug. 30, 2017.
Supplementary European Search Report in the European application No. 17812772.6, dated Feb. 27, 2019.
First Office Action of the Chinese application No. 201610438816.1, dated Nov. 2, 2018.
Notice of Allowance of the Chinese application No. 201610438816.1, dated May 16, 2019.

* cited by examiner

SCENARIO-BASED SOUND EFFECT CONTROL METHOD AND ELECTRONIC DEVICE

CROSS-REFERENCE TO RELATED APPLICATIONS

This is a continuation application of U.S. application Ser. No. 16/083,590, filed on Sep. 10, 2018, which is a national phase of International Patent Application No. PCT/CN2017/088789, filed on Jun. 16, 2017, which claims the priority benefit of Chinese Patent Application No. 201610438816.1 filed on Jun. 16, 2016, the contents of which are incorporated by reference herein in their entireties for all purposes.

TECHNICAL FIELD

The disclosure relates to the technical field of computers, and more particularly to a method for controlling a scene sound effect and electronic equipment.

BACKGROUND

A sound effect is an effect achieved by a sound and refers to a noise or sound added to enhance the sense of reality, atmosphere or dramatic information of a certain scene. The added noise or sound may include a musical sound and an effect sound, for example, a digital sound effect, an environmental sound effect and a Moving Picture Experts Group Audio Layer-3 (MP3) sound effect (ordinary sound effect and professional sound effect).

Accordingly, sound effects, sometimes also called audio effects, are artificial or enhanced sounds adopted to enhance sound processing for movies, electronic games, music or arts of other media or other contents. A scene sound effect is a sound effect applied for more specific application scene, involving a sound effect related to the current application scene.

SUMMARY

According to a first aspect, embodiments of the disclosure provide a method for controlling a scene sound effect. After electronic equipment is turned on, a monitoring service is enabled. The electronic equipment monitors whether an audio decoder and/or a video decoder are/is newly created in the electronic equipment or not by means of the monitoring service. If the electronic equipment determines that the audio decoder and the video decoder are newly created in the electronic equipment, a scene of an application for playing video is determined. The electronic equipment acquires a scene sound effect corresponding to the scene of the application and sets a present sound effect of the electronic equipment to be the scene sound effect.

According to a second aspect, the embodiments of the disclosure further provide electronic equipment, which includes: a monitoring control unit, a monitoring unit, a scene determination unit and a sound effect control unit. The monitoring control unit is configured to, after the electronic equipment is turned on, enable a monitoring service. The monitoring unit is configured to monitor whether an audio decoder and/or a video decoder are newly created in the electronic equipment or not by means of the monitoring service. The scene determination unit is configured to, if the monitoring unit determines that the audio decoder and the video decoder are newly created in the electronic equipment, determine a scene of an application for playing video. The sound effect control unit is configured to acquire, by the electronic equipment, a scene sound effect corresponding to the scene of the application and set a present sound effect of the electronic equipment to be the scene sound effect.

According to a third aspect, the embodiments of the disclosure further provide another electronic equipment, which includes a processor, a memory and an audio output device configured to output a scene sound effect. The processor may be configured to execute any method provided by the embodiments of the disclosure.

According to a fourth aspect, the embodiments of the disclosure further provide a computer-readable storage medium for storing a computer program configured for electronic data exchange. The computer program may be executed to implement any method provided by the embodiments of the disclosure.

According to a fifth aspect, the embodiments of the disclosure further provide a program product, which may be executed to implement the method provided by the embodiments of the disclosure.

The embodiments of the disclosure have the following advantages. The audio decoder and video decoder newly created in the electronic equipment are monitored. Since typically, an audio decoder and a video decoder may be newly created only when a video is played, the scene of the application may be accurately determined. This process avoids human intervention to setting of the scene sound effect. Therefore, on the premise of ensuring relatively higher accuracy of the scene sound effect, operations are simplified, and utilization efficiency of the electronic equipment is improved.

BRIEF DESCRIPTION OF DRAWINGS

The drawings required to be used in descriptions about the embodiments will be briefly introduced below.

DETAILED DESCRIPTION

Adoption of different sound processing technologies for sound effects in different scenes may achieve different effects, so that an auditory experience of a user may be greatly improved by increasing a recognition rate of an application scene and setting a corresponding sound effect mode.

At present, a scene sound effect may include a sound effect of a music playing application scene, a sound effect of a video playing scene or the like. Control over a scene sound effect is manually set by the user, and a specific flow is as follows.

Electronic equipment acquires the scene sound effect manually input/selected by the user by means of an interaction interface, and then the electronic equipment sets a present scene sound effect to be the scene sound effect manually input/selected by the user.

Accuracy of the scene sound effect set above is relatively higher. However, it is troublesome in operation, and utilization efficiency of the electronic equipment is relatively lower.

Figure 1:
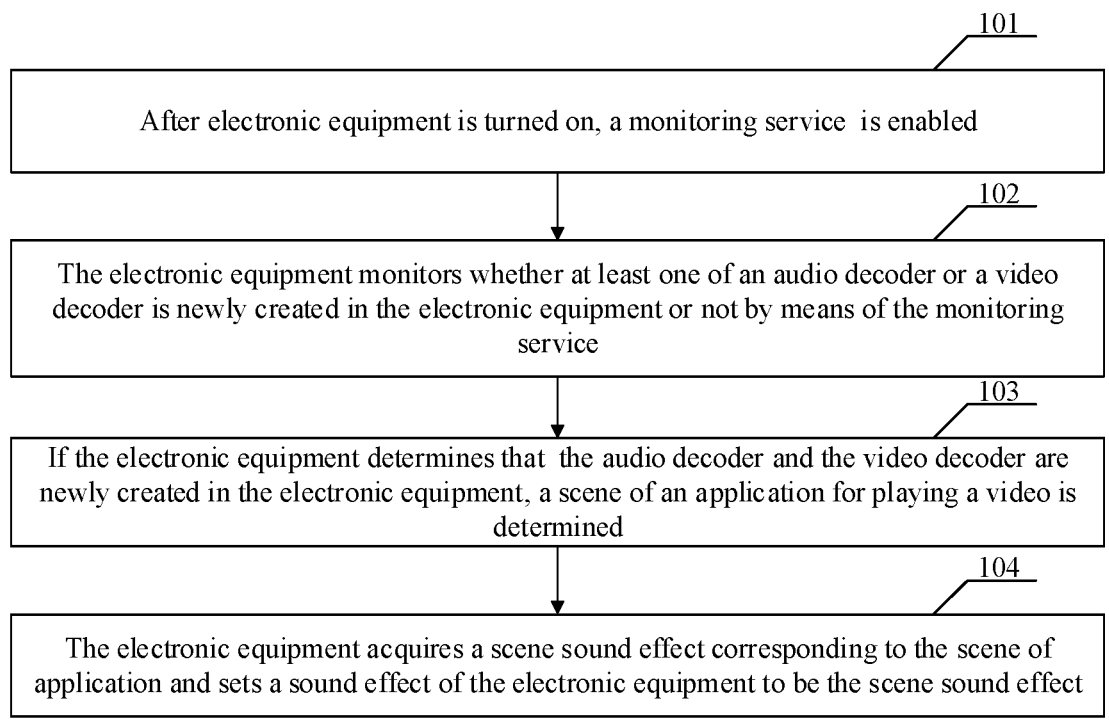
FIG. 1 is a flowchart of a method according to an embodiment of the disclosure.

An embodiment of the disclosure provides a method for controlling a scene sound effect. As shown in FIG. 1, the method includes the following operations.

In 101, after electronic equipment is turned on, a monitoring service is enabled.

In the embodiment, the monitoring service may be implemented by a hardware entity and may also be based on a software function of the hardware entity. There are no exclusive limits made in the embodiment of the disclosure.

In 102, the electronic equipment monitors whether an audio decoder and/or a video decoder are/is newly created in the electronic equipment or not by means of the monitoring service.

An audio decoder and a video decoder may also sometimes be called an audio/video decoder for short. The audio decoder and the video decoder may be independently created. For example, in a music playing process, there may be an audio decoder only. In a scene of an application for playing video, both of an audio decoder and a video decoder may be created. The audio decoder and the video decoder may usually be software functional modules. If a hard decoding manner is adopted, the audio decoder and the video decoder may also be hardware entities. At this moment, creation of the audio decoder and/or the video decoder should be understood to be that a video decoding and/or audio decoding requirement is submitted to the corresponding hardware entities.

In 103, if the electronic equipment determines that the audio decoder and the video decoder are newly created in the electronic equipment, a present video playing application scene is determined.

According to the embodiment of the disclosure, based on a property of the scene of the application, i.e., a property of creation of both the audio decoder and the video decoder, a present video playing application scene situation may be accurately determined.

In 104, the electronic equipment acquires a scene sound effect corresponding to the scene of the application and sets a present sound effect of the electronic equipment to be the scene sound effect.

According to the embodiment of the disclosure, the audio decoder and video decoder newly created in the electronic equipment are monitored, and since an audio decoder and a video decoder may be newly created only when a video is played under a normal circumstance, the scene of the application may be accurately determined. This process avoids human intervention to setting of the scene sound effect. Therefore, on the premise of ensuring relatively higher accuracy of the scene sound effect, operations are simplified, and utilization efficiency of the electronic equipment is improved.

Since audio decoders and video decoders are also divided into different types according to a decoding data format, a calculation amount or the like, different audio decoders and video decoders may correspond to different video playing application scenes. Specifically, before the electronic equipment acquires the scene sound effect corresponding to the scene of the application, the method further includes that types of the newly created audio decoder and video decoder are determined, and the present video playing application scene and a type of the scene of the application are determined.

The operation that the electronic equipment acquires the scene sound effect corresponding to the scene of the application includes that the electronic equipment acquires the scene sound effect corresponding to the type of the scene of the application.

The scene of the application may be a film video playing scene, a game video playing scene or the like.

Different types of audio decoders and video decoders are divided according to types. Since local maintenance in the electronic equipment may be limited by a calculation capability and data acquisition capability of the electronic equipment, this function may be realized at a server side, and a data support is provided for the electronic equipment by virtue of a big data acquisition advantage and high calculation capability of the server. Specifically, before the electronic equipment acquires the scene sound effect corresponding to the type of the scene of the application, the method further includes that the electronic equipment establishes a communication connection with a server located at a network side and sends a query request to the server at the network side through the communication connection, the query request containing the type of the scene of the application and a correspondence between a type of a scene of an application for playing a video and a scene sound effect being stored in the server at the network side, and the electronic equipment receives identification information of the scene sound effect from the server.

The operation that the electronic equipment acquires the scene sound effect corresponding to the type of the scene of the application includes that: the electronic equipment acquires the scene sound effect specified by the identification information.

In the embodiment, the scene sound effect may be locally stored in the electronic equipment and the scene sound effect is controlled by the server side, which is favorable for the server side, for example, an operating company side, to flexibly control use of the scene sound effect of the electronic equipment.

In addition, the correspondence between the type of the scene of the application and the scene sound effect may also be maintained locally in the electronic equipment. The correspondence between the type of the scene of the application and the scene sound effect may be downloaded from the server at the network side in advance. Moreover, the scene sound effect may be stored locally in the electronic equipment. Specifically, before the electronic equipment acquires the scene sound effect corresponding to the type of the scene of the application, the method further includes that the electronic equipment locally maintains the correspondence between the type of the scene of the application and the scene sound effect in the electronic equipment.

The operation that the electronic equipment acquires the scene sound effect corresponding to the type of the scene of the application includes that the electronic equipment determines the scene sound effect corresponding to the type of the scene of the application according to the locally maintained correspondence between the type of the scene of the application and the scene sound effect and acquires the scene sound effect from a library of scene sound effects locally stored in the electronic equipment.

According to the embodiment, the correspondence, locally maintained in the electronic equipment, between the type of the scene of the application and the scene sound effect is adopted, so that query to the server is avoided, and the scene sound effect may be determined more rapidly.

The embodiment of the disclosure further provides a specific monitoring manner. Specifically, the operation that the electronic equipment monitors the newly created audio decoder and/or video decode in the electronic equipment by means of the monitoring service includes that the electronic equipment monitors the audio decoder and/or video decoder of media service by means of sound effect service with the monitoring function.

Herein, the media service is a functional module responsible for audio/video decoder creation, and whether a new audio/video decoder is created or not may be monitored. At this moment, a name of the audio/video decoder may be obtained.

Furthermore, on the basis of adoption of monitoring over the media service, the embodiment of the disclosure provides a more specific implementation solution to how to learn that the audio decoder and the video decoder are newly created. If the electronic equipment monitors that the audio decoder and video decoder of the media service are newly created by means of the sound effect service with the monitoring function, names of the audio decoder and the video decoder are acquired and reported to an application layer of the electronic equipment; and the application layer of the electronic equipment learns that the audio decoder and the video decoder are newly created in the electronic equipment.

Figure 2:
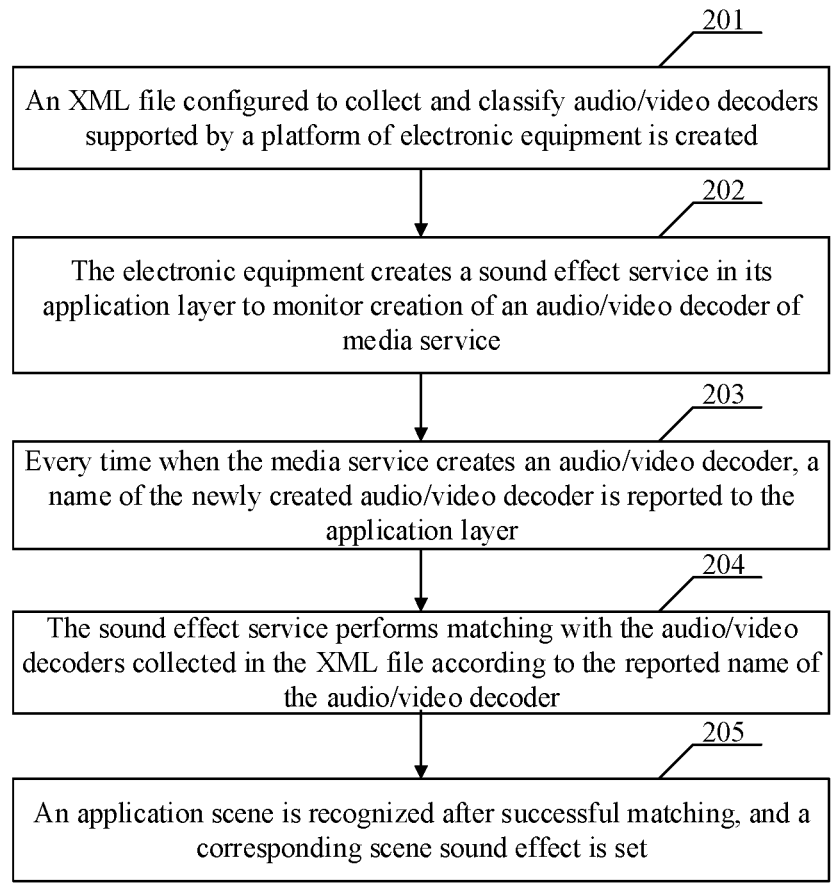
FIG. 2 is a flowchart of a method according to an embodiment of the disclosure.

As shown in FIG. 2, an embodiment of the disclosure further provides another more specific method flow for description as an example, which includes the following operations.

In 201, electronic equipment creates an Extensible Markup Language (XML) file configured to collect and classify audio/video decoders supported by a platform of the electronic equipment in its application layer and determines a correspondence between types of audio/video decoders and types of application scenes.

In 202, the electronic equipment creates sound effect service in its application layer to monitor creation of an audio/video decoder of media service.

In 203, every time when an operation of creating an audio/video decoder of the media service is executed, a name of the newly created audio/video decoder is reported to the application layer.

In 204, the sound effect service performs matching with the audio/video decoders collected in the XML file according to the reported name of the audio/video decoder.

In 205, an application scene is recognized after successful matching, and a corresponding scene sound effect is set.

Figure 3:
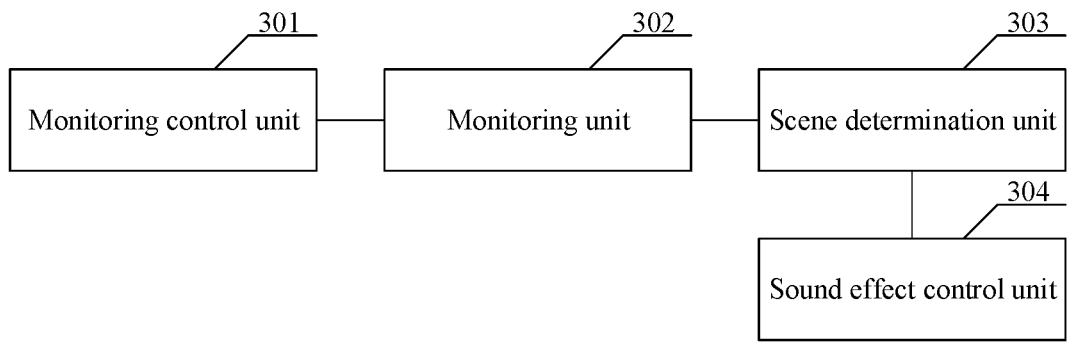
FIG. 3 is a structure diagram of electronic equipment according to an embodiment of the disclosure.

An embodiment of the disclosure further provides electronic equipment. As shown in FIG. 3, the electronic equipment includes a monitoring control unit 301, a monitoring unit 302, a scene determination unit 303, and a sound effect control unit 304.

The monitoring control unit 301 is configured to, after the electronic equipment is turned on, enable a monitoring service.

The monitoring unit 302 is configured to monitor whether an audio decoder and/or a video decoder are newly created in the electronic equipment or not by means of the monitoring service.

The scene determination unit 303 is configured to, if the monitoring unit 302 determines that the audio decoder and the video decoder are newly created in the electronic equipment, determine a present video playing application scene.

The sound effect control unit 304 is configured to acquire, by the electronic equipment, a scene sound effect corresponding to the scene of the application and set a present sound effect of the electronic equipment to be the scene sound effect.

In the embodiment, the monitoring service may be implemented by a hardware entity and may also be based on a software function of the hardware entity. There are no exclusive limits made in the embodiment of the disclosure.

An audio decoder and a video decoder may also sometimes be called an audio/video decoder for short. The audio decoder and the video decoder may be independently created. For example, in a music playing process, there may be an audio decoder only. In a scene of an application for playing a video, both of an audio decoder and a video decoder may be created. The audio decoder and the video decoder may usually be software functional modules. If a hard decoding manner is adopted, the audio decoder and the video decoder may also be hardware entities. At this moment, creation of the audio decoder and/or the video decoder should be understood to be that a video decoding and/or audio decoding requirement is submitted to the corresponding hardware entities.

According to the embodiment of the disclosure, based on a property of the scene of the application, i.e., a property of creation of both the audio decoder and the video decoder, a present video playing application scene condition may be accurately determined.

According to the embodiment of the disclosure, the audio decoder and video decoder newly created in the electronic equipment are monitored, and since an audio decoder and a video decoder may be newly created only when a video is played under a normal circumstance, the scene of the application may be accurately determined. This process avoids human intervention to setting of the scene sound effect. Therefore, on the premise of ensuring relatively higher accuracy of the scene sound effect, operations are simplified, and utilization efficiency of the electronic equipment is improved.

Figure 4:
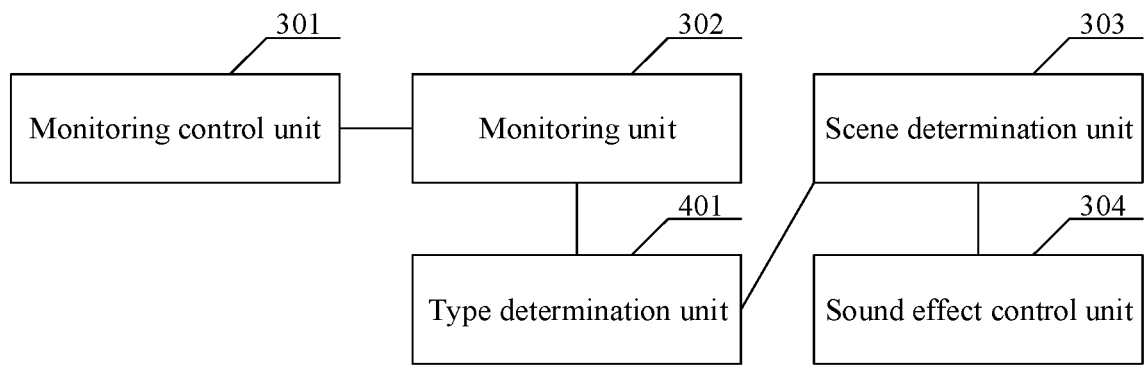
FIG. 4 is a structure diagram of electronic equipment according to an embodiment of the disclosure.

Since audio decoders and video decoders are also divided into different types according to a decoding data format, a calculation amount or the like, different audio decoders and video decoders may correspond to different video playing application scenes. Specifically, as shown in FIG. 4, the electronic equipment further includes a type determination unit 401, configured to, before the sound effect control unit 304 acquires the scene sound effect corresponding to the scene of the application, determine types of the newly created audio decoder and video decoder.

The scene determination unit 303 is specifically configured to, if the monitoring unit determines that the audio decoder and the video decoder are newly created in the electronic equipment, determine the present video playing application scene and a type of the scene of the application.

The sound effect control unit 304 is specifically configured to acquire the scene sound effect corresponding to the type of the scene of the application and set the present sound effect of the electronic equipment to be the scene sound effect.

The scene of the application may be a film video playing scene, a game video playing scene or the like.

Figure 5:
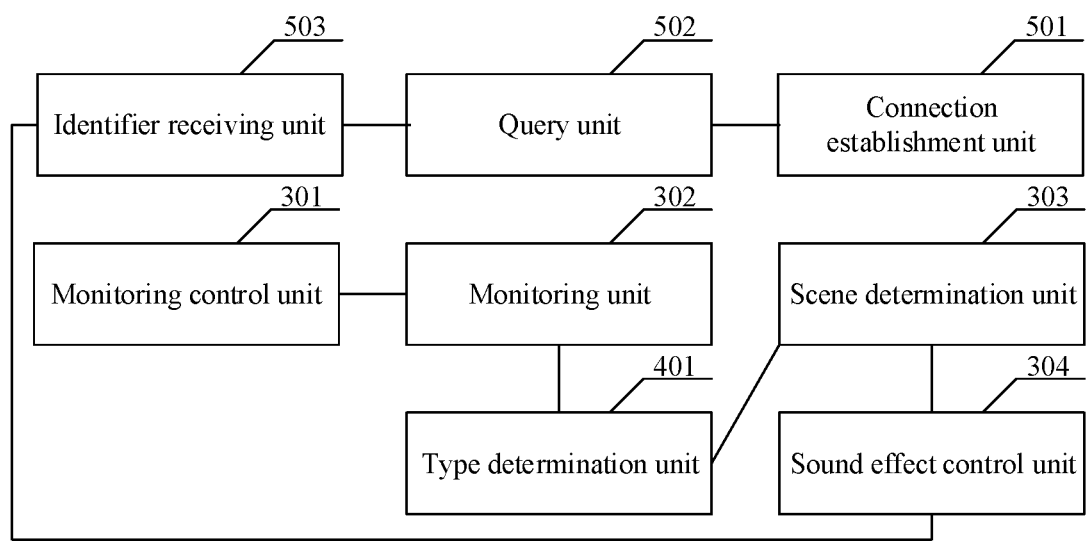
FIG. 5 is a structure diagram of electronic equipment according to an embodiment of the disclosure.

Different types of audio decoders and video decoders are divided according to types, and local maintenance in the electronic equipment may be limited by a calculation capability and data acquisition capability of the electronic equipment, so that this function may be realized at a server side, and a data support is provided for the electronic equipment by virtue of a big data acquisition advantage and high calculation capability of the server. Specifically, as shown in FIG. 5, the electronic equipment further includes: a connection establishment unit 501, configured to, before the sound effect control unit 304 acquires the scene sound effect corresponding to the type of the scene of the application, establish a communication connection with a server located at a network side; a query unit 502, configured to send a query request to the server at the network side through the communication connection, the query request containing the type of the scene of the application and a correspondence between a type of a scene of an application for playing a video and a scene sound effect being stored in the server at the network side, and an identifier receiving unit 503, configured to receive identification information of the scene sound effect from the server.

The sound effect control unit 304 is specifically configured to acquire the scene sound effect specified by the identification information and set the present sound effect of the electronic equipment to be the scene sound effect.

In the embodiment, the scene sound effect may be locally stored in the electronic equipment and the scene sound effect is controlled by the server side, which is favorable for the server side, for example, an operating company side, to flexibly control use of the scene sound effect of the electronic equipment.

Figure 6:
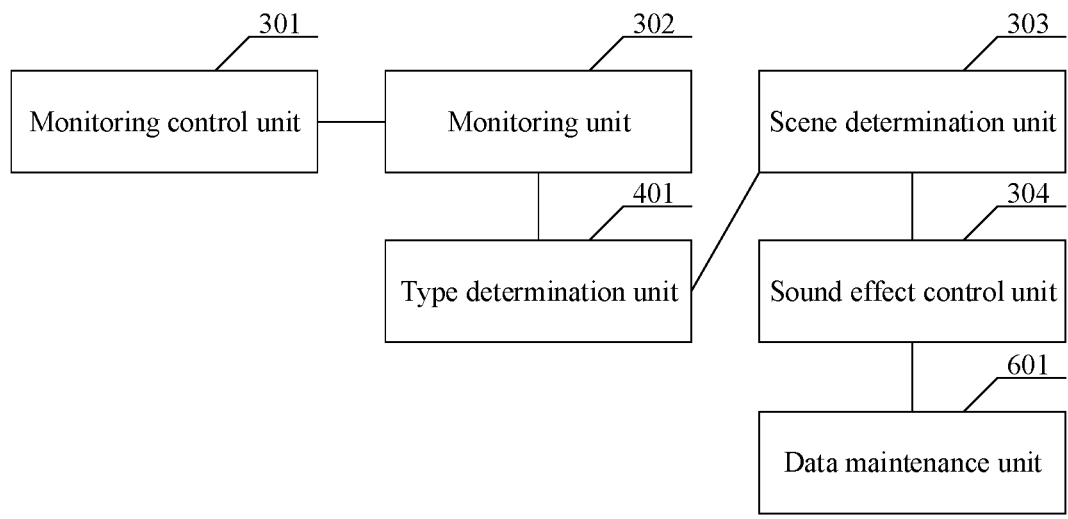
FIG. 6 is a structure diagram of electronic equipment according to an embodiment of the disclosure.

In addition, the correspondence between the type of the scene of the application and the scene sound effect may also be maintained locally in the electronic equipment, the correspondence between the type of the scene of the application and the scene sound effect may be downloaded from the server at the network side in advance. Moreover, the scene sound effect may be stored locally in the electronic equipment. Specifically, as shown in FIG. 6, the electronic equipment further includes a data maintenance unit 601, configured to locally maintain the correspondence between the type of the scene of the application and the scene sound effect in the electronic equipment.

The sound effect control unit 304 is specifically configured to determine, by the electronic equipment, the scene sound effect corresponding to the type of the scene of the application according to the locally maintained correspondence between the type of the scene of the application and the scene sound effect and acquire the scene sound effect from a library of scene sound effects locally stored in the electronic equipment.

According to the embodiment, the correspondence, locally maintained in the electronic equipment, between the type of the scene of the application and the scene sound effect is adopted, so that query to the server is avoided, and the scene sound effect may be determined more rapidly.

The embodiment of the disclosure further provides a specific monitoring manner. Optionally, the monitoring unit 302 is specifically configured to monitor the audio decoder and/or video decoder of media service by means of sound effect service with the monitoring function.

Herein, the media service is a functional module responsible for audio/video decoder creation, and whether a new audio/video decoder is created or not may be monitored. At this moment, a name of the audio/video decoder may be obtained.

Furthermore, on the basis of adoption of monitoring over the media service, the embodiment of the disclosure provides a more specific implementation solution to how to learn that the audio decoder and the video decoder are newly created. The monitoring unit 302 is specifically configured to, if monitoring that the audio decoder and video decoder of the media service are newly created by means of the sound effect service with the monitoring function, acquire and report names of the audio decoder and the video decoder to an application layer of the electronic equipment to enable the application layer to learn that the audio decoder and the video decoder are newly created in the electronic equipment.

Figure 7:
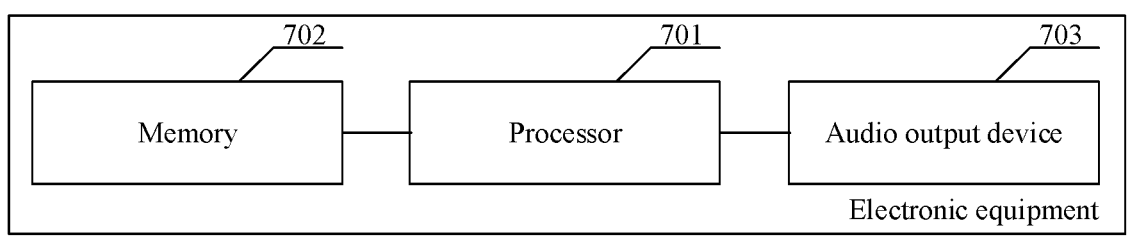
FIG. 7 is a structure diagram of electronic equipment according to an embodiment of the disclosure.

An embodiment of the disclosure further provides another piece of electronic equipment, which, as shown in FIG. 7, includes: a processor 701, a memory 702 and an audio output device 703 configured to output a scene sound effect. The memory 702 may be configured to provide a cache required by execution of data processing for the processor 701, and may further provide a storage space for audio data of the scene sound effect. The audio data of the scene sound effect may be from a network side. The local memory 702 of the electronic equipment may provide a downloading buffer memory space.

The processor 701 is configured to, after the electronic equipment is turned on, enable a monitoring service, monitor whether an audio decoder and/or a video decoder are newly created in the electronic equipment or not by means of the monitoring service, if it is determined that the audio decoder and the video decoder are newly created in the electronic equipment, determine a present video playing application scene, acquire a scene sound effect corresponding to the scene of the application and set a present sound effect of the electronic equipment to be the scene sound effect.

In the embodiment, the monitoring service may be implemented by a hardware entity and may also be based on a software function of the hardware entity. There are no exclusive limits made in the embodiment of the disclosure.

An audio decoder and a video decoder may also sometimes be called an audio/video decoder for short. The audio decoder and the video decoder may be independently created. For example, in a music playing process, there may be an audio decoder only. In a scene of an application for playing video, both of an audio decoder and a video decoder may be created. The audio decoder and the video decoder may usually be software functional modules. If a hard decoding manner is adopted, the audio decoder and the video decoder may also be hardware entities. At this moment, creation of the audio decoder and/or the video decoder should be understood to be that a video decoding and/or audio decoding requirement is submitted to the corresponding hardware entities.

According to the embodiment of the disclosure, based on a property of the scene of the application, i.e., a property of creation of both the audio decoder and the video decoder, a present video playing application scene condition may be accurately determined.

According to the embodiment of the disclosure, the audio decoder and video decoder newly created in the electronic equipment are monitored, and since an audio decoder and a video decoder may be newly created only when a video is played under a normal circumstance, the scene of the application may be accurately determined. This process avoids human intervention to setting of the scene sound effect. Therefore, on the premise of ensuring relatively higher accuracy of the scene sound effect, operations are simplified, and utilization efficiency of the electronic equipment is improved.

Since audio decoders and video decoders are also divided into different types according to a decoding data format, a calculation amount or the like, different audio decoders and video decoders may correspond to different video playing application scenes. Specifically, the processor 701 is further configured to, before the scene sound effect corresponding to the scene of the application is acquired, determine types of the newly created audio decoder and video decoder and determine the present video playing application scene and a type of the scene of the application.

The processor 701 is configured to acquire the scene sound effect corresponding to the scene of the application by acquiring the scene sound effect corresponding to the type of the scene of the application.

The scene of the application may be a film video playing scene, a game video playing scene or the like.

Different types of audio decoders and video decoders are divided according to types, and local maintenance in the electronic equipment may be limited by a calculation capability and data acquisition capability of the electronic equipment, so that this function may be realized at a server side, and a data support is provided for the electronic equipment by virtue of a big data acquisition advantage and high calculation capability of the server. Specifically, the processor 701 is further configured to, before the scene sound effect corresponding to the type of the scene of the application is acquired, establish a communication connection with a server located at a network side, send a query request to the server at the network side through the communication connection, the query request containing the type of the scene of the application and a correspondence between a type of a scene of an application for playing a video and a scene sound effect being stored in the server at the network side, and receive identification information of the scene sound effect from the server. The processor 701 is configured to acquire the scene sound effect corresponding to the type of the scene of the application by acquiring the scene sound effect specified by the identification information.

In the embodiment, the scene sound effect may be locally stored in the electronic equipment and the scene sound effect is controlled by the server side, which is favorable for the server side, for example, an operating company side, to flexibly control use of the scene sound effect of the electronic equipment.

In addition, the correspondence between the type of the scene of the application and the scene sound effect may also be maintained locally in the electronic equipment, the correspondence between the type of the scene of the application and the scene sound effect may be downloaded from the server at the network side in advance. Moreover, the scene sound effect may be stored locally in the electronic equipment. Specifically, the processor 701 is further configured to, before the scene sound effect corresponding to the type of the scene of the application is acquired, locally maintain the correspondence between the type of the scene of the application and the scene sound effect in the electronic equipment. The processor 701 is configured to acquire the scene sound effect corresponding to the type of the scene of the application by determining the scene sound effect corresponding to the type of the scene of the application according to the locally maintained correspondence between the type of the scene of the application and the scene sound effect and acquiring the scene sound effect from a library of scene sound effects locally stored in the electronic equipment.

According to the embodiment, the correspondence, locally maintained in the electronic equipment, between the type of the scene of the application and the scene sound effect is adopted, so that query to the server is avoided, and the scene sound effect may be determined more rapidly.

The embodiment of the disclosure further provides a specific monitoring manner. Optionally, the processor 701 is configured to monitor the newly created audio decoder and/or video decoder in the electronic equipment by means of the monitoring service by monitoring the audio decoder and/or video decoder of media service by means of sound effect service with the monitoring function.

Herein, the media service is a functional module responsible for audio/video decoder creation, and whether a new audio/video decoder is created or not may be monitored. At this moment, a name of the audio/video decoder may be obtained.

Furthermore, on the basis of adoption of monitoring over the media service, the embodiment of the disclosure provides a more specific implementation solution to how to learn that the audio decoder and the video decoder are newly created. The processor 701 is further configured to, if monitoring that the audio decoder and video decoder of the media service are newly created by means of the sound effect service with the monitoring function, acquire and report names of the audio decoder and the video decoder to an application layer of the electronic equipment to enable the application layer to learn that the audio decoder and the video decoder are newly created in the electronic equipment.

Figure 8:
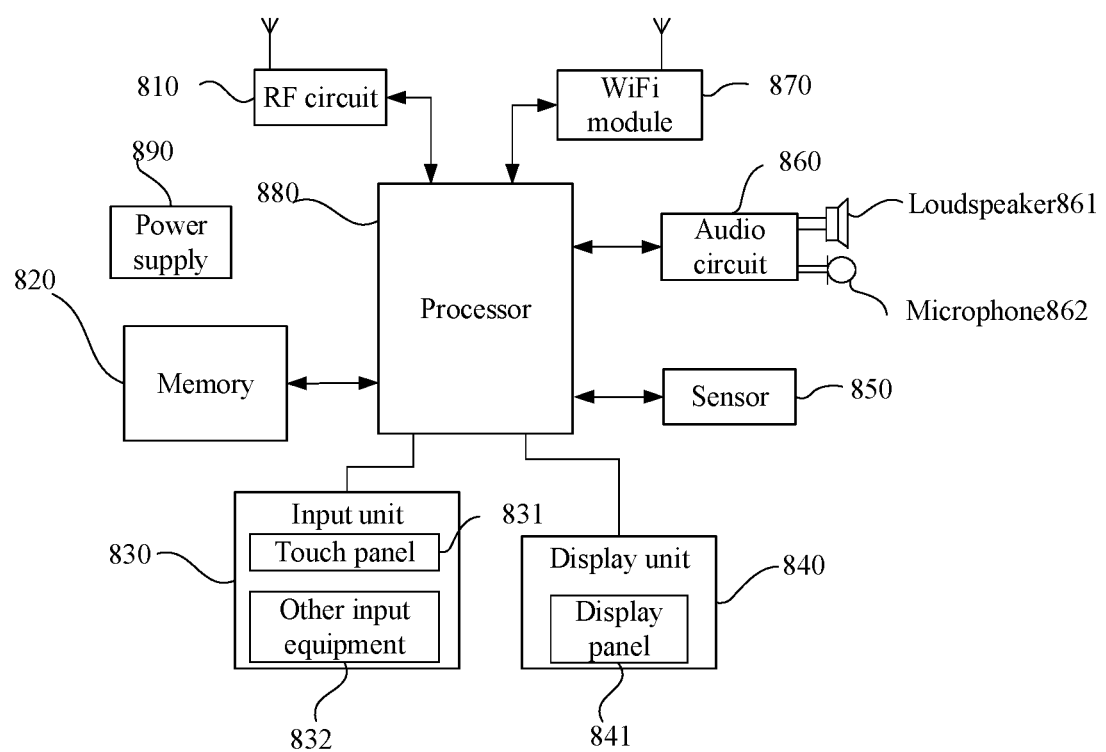
FIG. 8 is a structure diagram of terminal equipment according to an embodiment of the disclosure.

An embodiment of the disclosure further provides terminal equipment. As shown in FIG. 8, for convenient description, only parts related to the embodiment of the disclosure are shown, and specific technical details which are undisclosed refer to parts of the method of the embodiments of the disclosure. The terminal equipment may be any piece of terminal equipment including a mobile phone, a tablet computer, a Personal Digital Assistant (PDA), a Point of Sales (POS), a vehicle-mounted computer or the like. For example, the terminal equipment is a mobile phone.

FIG. 8 is a block diagram of part of a structure of a mobile phone related to terminal equipment according to an embodiment of the disclosure. Referring to FIG. 8, the mobile phone includes components such as a Radio Frequency (RF) circuit 810, a memory 820, an input unit 830, a display unit 840, a sensor 850, an audio circuit 860, a Wireless Fidelity (WiFi) module 870, a processor 880 and a power supply 890. Those skilled in the art should know that the structure of the mobile phone shown in FIG. 8 is not intended to limit the mobile phone and may include components more or fewer than those shown in the figure or some components are combined or different component arrangements are adopted.

Each component of the mobile phone will be specifically introduced below in combination with FIG. 8.

The RF circuit 810 may be configured to receive and send signals in an information receiving and sending or communication process, particularly after receiving downlink information of a base station, send it to the processor 880 for processing and, in addition, send designed uplink data to the base station. The RF circuit 810 usually includes, but not limited to, an antenna, at least one amplifier, a transceiver, a coupler, a Low Noise Amplifier (LNA), a duplexes or the like. In addition, the RF circuit 810 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) or the like.

The memory 820 may be configured to store a software program and a module, and the processor 880 operates the software program and module stored in the memory 820, thereby executing various function applications and data processing of the mobile phone. The memory 820 may mainly include a program storage region and a data storage region, wherein the program storage region may store an operating system, an application program required by at least one function (for example, a sound playing function and an image playing function) or the like, and the data storage region may store data (for example, audio data and a phonebook) created according to use of the mobile phone or the like. In addition, the memory 820 may include a high-speed random access memory, and may further include a non-volatile memory, for example, at least one disk storage device, flash memory device or other volatile solid-state storage device.

The input unit 830 may be configured to receive input digital or character information and generate key signal input related to user setting and function control of the mobile phone. Specifically, the input unit 830 may include a touch panel 831 and other input equipment 832. The touch panel 831, also called as a touch screen, may collect a touch operation (for example, operation executed by a user with any proper object or accessory such as a finger and a stylus on the touch panel 831 or nearby the touch panel 831) of the user thereon or nearby and drive a corresponding connection device according to a preset program. Optionally, the touch panel 831 may include two parts, i.e., a touch detection device and a touch controller, wherein the touch detection device detects a touch orientation of the user, detects a signal generated by a touch operation and sends the signal to the touch controller; and the touch controller receives touch information from the touch detection device and converts it into a contact coordinate for sending to the processor 880, and may receive and execute a command sent by the processor 880. In addition, the touch panel 831 may be implemented into multiple types such as a resistance type, a capacitance type, an infrared type and a surface acoustic wave type. Besides the touch panel 831, the input unit 830 may further include the other input equipment 832. Specifically, the other input equipment 832 may include, but not limited to, one or more of a physical keyboard, a function key (for example, a volume control key and an on-off key), a trackball, a mouse, a joystick or the like.

The display unit 840 may be configured to display information input by the user or information provided for the user and various menus of the mobile phone. The display unit 840 may include a display panel. Optionally, the display panel 841 may be configured in form of a Liquid Crystal Display (LCD), an Organic Light-Emitting Diode (OLED) or the like. Furthermore, the touch panel 831 may cover the display panel 841, the touch panel 831, after detecting the touch operation executed thereon or nearby, transmits it to the processor 880 to determine a type of a touch event, and the processor 880 subsequently provides corresponding visual output on the display panel 841 according to the type of the touch event. Although the touch panel 831 and display panel 841 in FIG. 8 realize input and output functions of the mobile phone as two independent components, the touch panel 831 and the display panel 841 may be integrated to realize the input and output functions of the mobile phone in some embodiments.

The mobile phone may further include at least one sensor 850, for example, a light sensor, a motion sensor and another sensor. Specifically, the light sensor may include an environmental light sensor and a proximity sensor, wherein the environmental light sensor may regulate brightness of the display panel 841 according to brightness of environmental light, and the proximity sensor may turn off the display panel 841 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function or the like (for example, a pedometer and knocking). Other sensors, for example, a gyroscope, a barometer, a hygrometer, a thermometer and an infrared sensor, which may be configured in the mobile phone will not be elaborated herein.

The audio circuit 860, a loudspeaker 861 and a microphone 862 may provide an audio interface between the user and the mobile phone. The audio circuit 860 may transmit an electric signal converted from received audio data to the loudspeaker 861, and then the loudspeaker 861 converts it into a sound signal for output. On the other aspect, the microphone 862 converts a collected sound signal into an electric signal, and then the audio circuit 860 receives and converts it into audio data and outputs the audio data to the processor 780 for processing and sending to, for example, another mobile phone through the RF circuit 810 or outputs the audio data to the memory 820 for further processing.

WiFi is a short-distance wireless communication technology. The mobile phone may help the user to receive and send an electronic mail, browse a webpage, access streaming media or the like through the WiFi module 870, and provides wireless broadband Internet access for the user. Although the WiFi module 870 is shown in FIG. 8, it can be understood that it is not a necessary component of the mobile phone and may completely be omitted according to a requirement without changing the scope of the essence of the disclosure.

The processor 880 is a control center of the mobile phone, connects each part of the whole mobile phone by virtue of various interfaces and lines and executes various functions and data processing of the mobile phone by operating or executing the software program and/or module stored in the memory 820 and calling data stored in the memory 820, thereby monitoring the whole mobile phone. Optionally, the processor 880 may include one or more processing units. Preferably, the processor 880 may integrate an application processor and a modulation and demodulation processor, wherein the application processor mainly processes the operating system, a UI, an application program or the like, and the modulation and demodulation processor mainly processes wireless communication. It can be understood that the modulation and demodulation processor may also not be integrated into the processor 880.

The mobile phone further includes a power supply 890 (for example, a battery) supplying power to each component. Preferably, the power supply may be logically connected with the processor 880 through a power management system, thereby realizing functions of charging and discharging management, power consumption management or the like through the power management system.

Although not shown in the figure, the mobile phone may further include a camera, a Bluetooth module or the like, which will not be elaborated herein.

In the embodiment of the disclosure, the processor 880 of the terminal equipment further has functions corresponding to the processor 701 in the abovementioned embodiment.

It is noted that, in the embodiment of the electronic equipment, each included unit is only divided according to a function logic but is not limited to abovementioned division as long as the corresponding function may be realized. In addition, a specific name of each functional unit is only for convenient distinction and not intended to limit the scope of protection of the disclosure.

In addition, those of ordinary skilled in the art can understand that implementation of all or part of the steps in each method embodiment may be completed by related hardware instructed by a program, the corresponding program may be stored in a computer-readable storage medium, and the abovementioned storage medium may be a read-only memory, a magnetic disk, an optical disk or the like.

The invention claimed is:

1. A method for controlling a scene sound effect, comprising:
    enabling a monitoring service after an electronic device is turned on;
    monitoring, by the electronic device, whether at least one of an audio decoder or a video decoder is newly created in the electronic device or not by means of sound effect service with the monitoring service, which comprises:
    in a case that the electronic device monitors that the audio decoder and the video decoder of the media service are newly created by means of the sound effect service with the monitoring function, acquiring and reporting names of the audio decoder and the video decoder to an application layer of the electronic device, wherein the application layer learns that the audio decoder and the video decoder are newly created in the electronic device, wherein the application layer of the electronic device creates an Extensible Markup Language (XML) file configured to collect and classify an audio decoder and a video decoder supported by a platform of the electronic device and determine a correspondence between types of audio and video decoders and types of application scenes;
    in the case that the electronic device determines that the audio decoder and the video decoder are newly created in the electronic device, determining a scene of an application for playing a video;
    determining types of the newly created audio decoder and video decoder and determining a type of the scene of the application for playing the video;
    acquiring, by the electronic device, a scene sound effect corresponding to the type of the scene of the application for playing the video; and
    setting a sound effect of the electronic device to be the scene sound effect,
    wherein the method further comprises: before acquiring, by the electronic device, the scene sound effect corresponding to the type of the scene of the application for playing the video,
    establishing, by the electronic device, a communication connection with a server located at a network side and sending a query request to the server at the network side through the communication connection, the query request comprising the type of the scene of the application for playing the video, and a correspondence between a type of a scene of an application for playing the video and a scene sound effect being stored in the server at the network side, and
    receiving, by the electronic device, identification information of the scene sound effect from the server,
    wherein acquiring, by the electronic device, the scene sound effect corresponding to the type of the scene of the application for playing the video comprises:
    acquiring, by the electronic device, the scene sound effect specified by the identification information.

2. The method according to claim 1, before acquiring, by the electronic device, the scene sound effect corresponding to the type of the scene of the application for playing the video, further comprising:
    locally maintaining, by the electronic device, the correspondence between the type of the scene of the application for playing the video and the scene sound effect in the electronic device,
    wherein acquiring, by the electronic device, the scene sound effect corresponding to the type of the scene of the application for playing the video comprises:
    determining, by the electronic device, the scene sound effect corresponding to the type of the scene of the application for playing the video according to the locally maintained correspondence between the type of the scene of the application for playing the video and the scene sound effect; and
    acquiring the scene sound effect from a library of scene sound effects locally stored in the electronic device.

3. An electronic device, comprising:
    a processor;
    a memory having stored thereon a software program,
    the processor is configured to execute operations of:
    enabling a monitoring service after the electronic device is turned on;
    monitoring whether at least one of an audio decoder or a video decoder is newly created in the electronic device or not by means of the monitoring service;
    in the case that it is determined that the audio decoder and the video decoder are newly created in the electronic device, determining a scene of an application for playing a video; and
    acquiring a scene sound effect corresponding to the scene of the application for playing the video, and setting a sound effect of the electronic device to be the scene sound effect,
    wherein the processor is further configured to execute operations of:
    before acquiring the scene sound effect corresponding to the scene of the application for playing the video, determining types of the newly created audio decoder and video decoder,
    in the case that it is determined that the audio decoder and the video decoder are newly created in the electronic device, determining the scene of the application for playing the video and a type of the scene of the application for playing the video; and
    acquiring the scene sound effect corresponding to the type of the scene of the application for playing the video and setting the sound effect of the electronic device to be the scene sound effect,
    monitoring at least one of the audio decoder or video decoder of media service by means of a sound effect service with the monitoring function,
    wherein the processor is further configured to execute operations of: if monitoring that the audio decoder and video decoder of the media service are newly created by means of the sound effect service with the monitoring function, acquiring and reporting names of the audio decoder and the video decoder to an application layer of the electronic device to enable the application layer to learn that the audio decoder and the video decoder are newly created in the electronic device,
    the application layer of the electronic device creates an Extensible Markup Language (XML) file configured to collect and classify an audio decoder and a video decoder supported by a platform of the electronic device and determine a correspondence between types of audio and video decoders and types of application scenes, wherein the processor is further configured to execute operations of:

before acquiring the scene sound effect corresponding to the type of the scene of the application for playing the video, establishing a communication connection with a server located at a network side;

sending a query request to the server at the network side by means of the communication connection, the query request comprising the type of the scene of the application for playing the video, and a correspondence between a type of a scene of an application for playing the video and a scene sound effect being stored in the server at the network side; and receiving identification information of the scene sound effect from the server, wherein the processor is further configured to execute operations of: acquiring the scene sound effect specified by the identification information and setting the sound effect of the electronic device to be the scene sound effect.

4. The electronic device according to claim 3, wherein the processor is further configured to execute an operation of:

locally maintaining the correspondence between the type of the scene of the application and the scene sound effect in the electronic device, wherein the processor is further configured to execute an operation of:

determining the scene sound effect corresponding to the type of the scene of the application for playing the video according to the correspondence between the type of the scene of the application for playing the video and the scene sound effect and acquiring the scene sound effect from a library of scene sound effects stored in the electronic device.

5. A non-transitory computer-readable storage medium for storing a computer program, wherein the computer program instructs hardware to implement a method, which comprises:

enabling a monitoring service after an electronic device is turned on;

monitoring, by the monitoring service, whether at least one of an audio decoder or a video decoder is newly created in the electronic device or not by means of sound effect service with the monitoring service, which comprises: in a case that the electronic device monitors that the audio decoder and the video decoder of the media service are newly created by means of the sound effect service with the monitoring function, acquiring and reporting names of the audio decoder and the video decoder to an application layer of the electronic device, wherein the application layer learns that the audio decoder and the video decoder are newly created in the electronic device, wherein the application layer of the electronic device creates an Extensible Markup Language (XML) file configured to collect and classify an audio decoder and a video decoder supported by a platform of the electronic device and determine a correspondence between types of audio and video decoders and types of application scenes;

in the case that the electronic device determines that the audio decoder and the video decoder are newly created in the electronic device, determining a scene of an application for playing a video;

determining types of the newly created audio decoder and video decoder and determining a type of the scene of the application for playing the video; and acquiring a scene sound effect corresponding to the type of the scene of the application for playing the video; and setting a sound effect of the electronic device to be the scene sound effect, wherein the method further comprises: before acquiring, by the electronic device, the scene sound effect corresponding to the type of the scene of the application for playing the video:

establishing, by the electronic device, a communication connection with a server located at a network side and sending a query request to the server at the network side through the communication connection, the query request comprising the type of the scene of the application for playing the video, and a correspondence between a type of a scene of an application for playing the video and a scene sound effect being stored in the server at the network side, and receiving, by the electronic device, identification information of the scene sound effect from the server, wherein acquiring, by the electronic device, the scene sound effect corresponding to the type of the scene of the application for playing the video comprises:

acquiring, by the electronic device, the scene sound effect specified by the identification information.

6. The non-transitory computer-readable storage medium of claim 5, wherein the method further comprises: before acquiring, by the electronic device, the scene sound effect corresponding to the type of the scene of the application for playing the video, locally maintaining, by the electronic device, the correspondence between the type of the scene of the application for playing the video and the scene sound effect in the electronic device, wherein acquiring, by the electronic device, the scene sound effect corresponding to the type of the scene of the application for playing the video comprises:

determining, by the electronic device, the scene sound effect corresponding to the type of the scene of the application for playing the video according to the correspondence between the type of the scene of the application for playing the video and the scene sound effect; and acquiring the scene sound effect from a library of scene sound effects stored in the electronic device.

* * * * *